July 19, 1927.
J. A. MILLER
1,636,145
BRAKE MECHANISM AND THE LIKE
Filed May 15, 1926
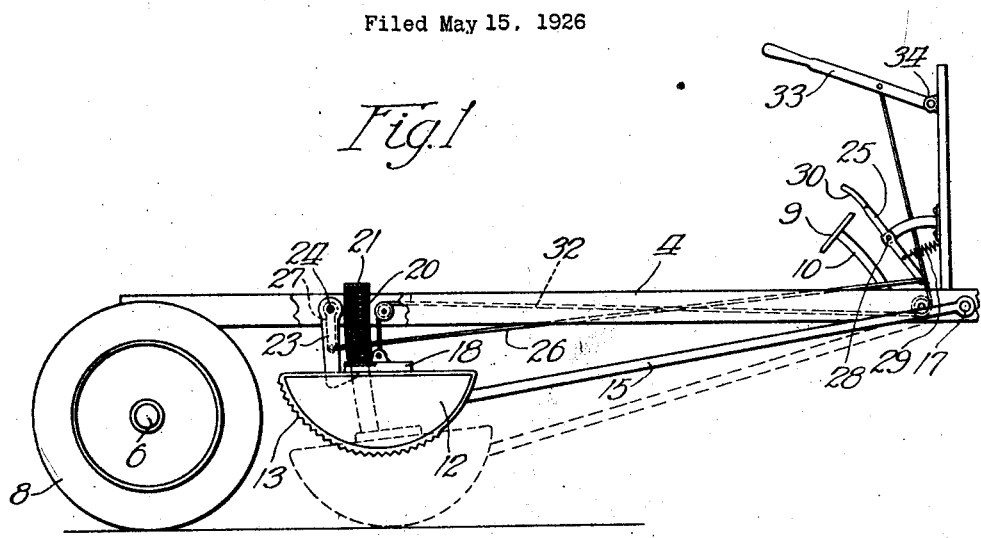
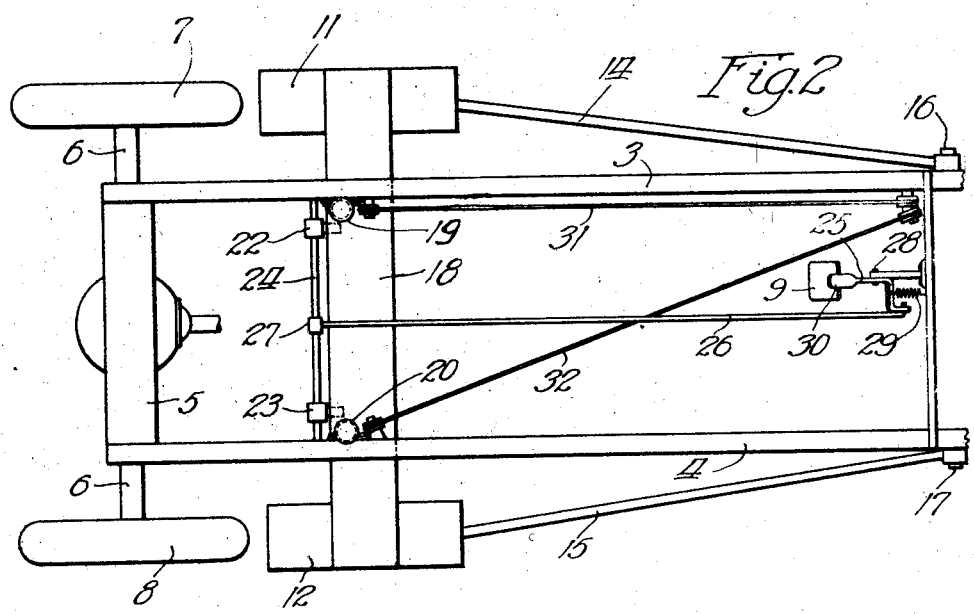
Inventor
John A. Miller Patented July 19, 1927.

1,636,145

UNITED STATES PATENT OFFICE.

JOHN A. MILLER, OF CHICAGO, ILLINOIS.

BRAKE MECHANISM AND THE LIKE.

Application filed May 15, 1926. Serial No. 109,334.

This invention has to do with improvements in the traction of vehicles such as automobiles, trucks, busses, coaches and the like. The main object of the invention is to provide means for effectively cleaning the pavement or roadway in advance of the driving and braking wheels so as to insure effective operation of said wheels to eliminate skidding, slipping, etc., and also to ensure better traction in starting, etc.

Another object of the invention is to provide an arrangement which is entirely under the control of the driver of the vehicle so that it can be brought into operation or its operation discontinued at any time under convenient control.

Another object of the invention is to associate the cleaning device with the brake pedal or brake operating mechanism that the cleaning device may be very easily controlled from driver's position, and in fact may be controlled by a simple movement of the same foot which the driver ordinarily uses for operating the brake pedal.

Other objects and uses of the invention will appear from a detailed description of the same which consists in the features of construction and combinations of parts hereinafter described and claimed.

In the drawing Fig. 1 shows a side elevation partly in section of a portion of a chassis having applied thereto a device embodying the features of the present invention. In this view the device is shown by full lines in the raised position and by dotted lines in the lowered position:

And Fig. 2 shows a plan view corresponding to Fig. 1.

The chassis illustrated includes the side frame bars 3 and 4 together with the rear cross frame member 5. It also includes the rear axle, housing 6, rear wheels 7 and 8 and other suitable mechanisms.

The brake pedal is shown at 9, the same being provided with the usual arm 10 which is operatively connected with the ordinary brake mechanism. It is not deemed necessary to illustrate or describe all these parts in greater detail.

At a position in advance of each of the rear wheels I place a road cleaning segment, such as the members 11 and 12. These devices are so located that when lowered into working position they will travel upon and clean the pavement at positions directly in front of the paths of the brake wheels 7 and 8. Normally the members 11 and 12 are sustained in the raised nonoperative position shown in full lines in Fig. 1 but they may be lowered when desired into the dotted line position.

Preferably the members 11 and 12 are of segmental form and their lower faces may be roughened or corrugated as shown at 13 in Fig. 1 so as to more effectively clean the pavement. Preferably also the members 11 and 12 are supported at the rear ends of radius arms 14 and 15 whose front ends are pivoted to the frame bars 3 and 4 at the points 16 and 17 as illustrated. The members 11 and 12 are also preferably connected together by a cross piece 18 so that they travel up and down as a rigid unit.

In order to control the up and down movements of the members 11 and 12 and prevent side swing I have illustrated the telescoping rods 19 and 20 at the two sides of the chassis. Each of these includes an outer tubular member which is secured to the chassis frame bar and a telescoping tubular member which is secured to the cross piece 18. Also a spring 21 is placed in each of the telescoping members, the same tending to force the cleaner down against the pavement with a sufficient pressure to insure thoroughly satisfactory operation.

The members 11 and 12 may be sustained in the raised position by means of hooks 22 and 23 which are carried by a rock arm 24 extending across the frame of the machine between the side bars 3 and 4 to which the rock shaft is journaled. These hooks are adapted to engage the cross piece 18 and sustain said cross piece together with the cleaners 11 and 12 but by forcing the hook backwards the cleaners will be released and thrown down against the pavement.

At a position convenient to the driver there is located an operating member 25 which is connected with the rock arm 24 by means of a link 26 and crank 27. The lever 25 is pivoted at the point 28 and a spring 29 normally draws the lever into the position of Fig. 1 so as to retain the hooks 22 and 23 in the operative position. By kicking against the upper end 30 of the lever 25 the hooks will be forced back and the road cleaners released.

Ordinarily the lever 25 is so mounted as to bring its upper end 30 at a position in close proximity to the brake pedal 9. Under these conditions the brake pedal is normally operated by the driver's foot in the usual manner, but whenever he wants to bring the road cleaners into action it is only necessary for him to kick forward at the time of manipulating the brake pedal so as to bring the road cleaners into operation without further thought on his part.

The road cleaners may be raised into the inoperative position in any convenient manner. For this purpose however I have illustrated a cable or cables 31 and 32 connected to the cross piece 18 at points close to the positions of the frame bars 3 and 4. Said ropes 31 and 32 pass over suitable pulleys to a control lever 33 pivoted to the frame of the machine at the point 34 and conveniently located with respect to the driver. By this means it is possible to raise the road cleaners into the inoperative position by merely raising up on the arm 33 as shown in Fig. 1.

While I have herein shown and described only certain embodiments of the features of my present invention, still I do not intend to limit myself to the same except as I may do so in the claims.

I claim:

1. The combination with the rear wheels and brake mechanism of an automotive vehicle including the brake pedal for operating the brake mechanism, of a pair of vertically movable road cleaning devices in advance of the wheels, links connected to said road cleaning devices, pivotal connections between said links and the vehicle at a position in advance of said road cleaning devices, permitting said devices to be swung down into contact with the pavement directly in advance of the wheels, spring means tending to force the road cleaning devices downwards against the pavement, a latch for normally sustaining the devices in a raised position, means convenient to the operator for raising the road cleaning devices to engage the latch, and means in proximity to the brake pedal aforesaid for disengaging the latch by the use of the foot which operates the pedal, to thereby allow the road cleaning devices to be lowered into operative position substantially as described.

2. The combination with the running gear of a motor vehicle including the rear wheels and the brake mechanism therefor, together with the control device for controlling said brake mechanism, of a pair of vertically movable road cleaning devices in advance of the rear wheels, spring means normally tending to lower said devices into cleaning contact with the pavement, means under control of the operator for raising said devices away from the pavement, latch means for retaining said devices in raised position, and means in proximity to the brake control device for disengaging said latch by the use of the same foot which is used for operating the brake control device substantially as described.

JOHN A. MILLER.